United States Patent [19]
Elspass et al.

[11] Patent Number: 5,807,629
[45] Date of Patent: Sep. 15, 1998

[54] TACTOIDAL ELASTOMER NANOCOMPOSITES

[75] Inventors: Chester W. Elspass, Alpha; Dennis George Peiffer, Annandale; Edward Nathan Kresge, Watchung, all of N.J.; Pamela Jean Wright, Easton, Pa.; James Joseph Chludzinski, Whitehouse, N.J.; Hsien Chang Wang, Bellaire, Tex.

[73] Assignee: Exxon Research and Engineering Company, Florham Park, N.J.

[21] Appl. No.: 749,438

[22] Filed: Nov. 15, 1996

[51] Int. Cl.$^6$ .................. B32B 5/16; B60C 5/00
[52] U.S. Cl. ............... 428/323; 428/324; 428/325; 428/492; 428/521; 152/450; 152/DIG. 16
[58] Field of Search .................. 428/323, 324, 428/325, 492, 521; 152/450, DIG. 16

[56] References Cited

U.S. PATENT DOCUMENTS

| | | | |
|---|---|---|---|
| 4,044,188 | 8/1977 | Segal | 428/283 |
| 4,810,734 | 3/1989 | Kawasumi et al. | 523/216 |
| 4,889,885 | 12/1989 | Usuki et al. | 524/445 |

*Primary Examiner*—Ponnathapura Achutamurthy
*Attorney, Agent, or Firm*—Paul E. Purwin

[57] ABSTRACT

An elastomeric material nanocomposite having sufficiently low air permeability to be useful as a tire inner liner among other things, can be prepared by dispersing a layered clay material into the elastomer in the form of packets having an average thickness in the range of about 100 Å to about 1400 Å. Accordingly, the present invention provides in one embodiment, a novel composite composition, and in another embodiment, a novel tire inner liner composition.

10 Claims, No Drawings

TACTOIDAL ELASTOMER NANOCOMPOSITES

FIELD OF THE INVENTION

This invention relates generally to the field of composite materials and more particularly to nanocomposites of elastomers, including natural and synthetic rubbers.

BACKGROUND OF THE INVENTION

By definition composite materials include two or more phases having different physical characteristics. Many composites incorporate fibers in a matrix of another material. For example, polymers are often reinforced with fibers of glass, ceramic, or carbon, whereas metals may be reinforced with ceramic fibers.

Layered clay minerals, such as montmorillonite, are composed of packets of face to face stacking of individual silicate layers having a thickness of about one nanometer. Dispersions of these individual or exfoliated layers in polymers are frequently referred to as nanocomposites in contrast to conventional composites in which the mineral exists as large aggregates in the polymer matrix.

Recently there has been considerable interest in forming nanocomposites as a means to improve the mechanical properties of polymers. Incorporating clay minerals in a polymer matrix, however, does not always result in markedly improved mechanical properties of the polymer. This may be due in part to the inability to dissociate a substantial portion of the layers of the packets of the layered material. It also has been attributed, in part, to a lack of affinity between the layered silicate mineral and the organic polymer.

One approach to overcoming the difficulty of forming nanocomposites from polymeric materials involves polymerizing a monomer in the presence of layered material pre-treated with a swelling agent. (See U.S. Pat. No. 4,810,734 and U.S. Pat. No. 4,889,885).

In PCT published application WO93/04118 a process is disclosed for forming a polymeric nanocomposite using a melt-processible polymer and a swellable and polymer compatible intercalated layer material. Although the publication discloses compatibilizing agents suitable for use with polymers such as polyolefins, polyesters and polyamides no procedure is disclosed for predicting utility of a compatibilizing agent with other classes of polymers.

In PCT published application WO 94/22680 there is disclosed a nanocomposite comprising a rubber which has a positively charged group, and a layered silicate that has a negative charge on the silicate whereby the negative charge on the silicate is connected to the positive charge on the rubber through ionic bonding or association thereby overcoming the bonding force between the layers of the silicate resulting in their separation.

Notwithstanding the foregoing research has been effected to incorporate layered minerals in a polymer matrix in such a way as to provide new materials with even better mechanical and other properties.

SUMMARY OF THE INVENTION

Surprisingly, it has been found that a new class of nanocomposite, hereinafter also referred to as a tactoidal nanocomposite, having sufficiently low air permeability to be useful as a tire inner liner among other things, can be prepared by dispersing a layered material in an elastomer in the form of packets having an average thickness in the range of about 100 Å to about 1400 Å.

Thus, in one embodiment of the present invention there is provided a novel tactoidal nanocomposite, and in another embodiment, a pneumatic tire having a novel tire inner liner.

Other embodiments of the invention will become apparent upon a reading of the detailed description which follows.

DETAILED DESCRIPTION OF THE INVENTION

The tactoidal nanocomposite of the present invention has a polymer matrix and a layered material dispersed therein. The polymer matrix of the composite is an elastomer such as natural rubber, polybutadiene, butadiene copolymers, copolymers of isobutylene and isoprene, functionalized copolymers of isobutylene and isoprene, copolymers of isobutylene and paramethyl styrene, and copolymers of isobutylene and a functionalized paramethyl styrene to mention a few.

In the case where the elastomer is an isoprene copolymer, the copolymer is typically functionalized with a halo group such as chlorine, bromine, iodine, a methacrylic, sulfonic, anhydride, amine, ethylene oxide, (i.e., maleic or succinic anhydride) group or mixture of groups. In general, the functional group will be covalently bonded to the isoprene moiety of the copolymer. In the present invention, it is particularly preferred that the copolymer be a brominated isobutylene isoprene copolymer.

In the case where the elastomer is a functionalized paramethyl styrene containing copolymer the functionalized group typically will be a halo group such as chloro, bromo or iodo group and preferably bromo. Typically, the preferred functionality is a benzylic bromide group.

Layered materials useful in the present invention are any swellable layered structures capable of being intercalated and having an individual layer thickness of from 0.01 to 20 nanometers and a diameter of from 0.05 to 10 microns. Included are natural and synthetic minerals that have at least some cation exchange capacity such as smectic clay, montmorillonite, hectorite, vermiculite, sapponite, hallocite, stevensite, beidellite, and layered aluminate oxides. These clay minerals are known to have a cation exchange capacity typically in the range of about 10 to 150 milliequivalents per 100 grams. Of these, montmorillonite and hectorite are preferred.

As is known, such layered minerals can be modified with swelling agents such as hydrocarbyl onium salts by contacting the layered mineral with the swelling agent in an appropriate liquid or flowable (i.e., melt) dispersant. Suitable liquid dispersants include water, alcohol, hydrocarbons and mixtures thereof, and flowable dispersants include positively charged molecules. Preferred onium salts are represented by the formulae $A^-M^+R^1R^2R^3R^4$ and $A^-Py^+R^4$, where $A^-$ denotes an anion such as $OH^-$, and $NO^-_3$, $SO^-_4$, $Cl^-$, $Br$ and the like; M denotes N, S or P; $R^1$, $R^2$, $R^3$, $R^4$ independently denote hydrogen, alkyl, and allyl groups having 1 to 40 carbon atoms and aryl groups; Py denotes the pyridinium or an alkyl substituted pyridinium group in which the alkyl group has 1 to 30 carbon atoms.

The amount of the swelling agent useful in aiding in the formation and dispersion of packets of materials is in the range of 1 to 1000% of the weight of the layered material and preferably from about 10 to 70% of the weight of the layered material.

The amount of the modified layered material that is combined with the polymer matrix material in forming composites of the present invention will vary widely depending upon the intended use of the composite. Suffice it to say, however, that the amount of layered material combined with the polymer matrix material will be sufficient to provide the advantages of this invention. Typically, the lower amount of layered material will be about 0.1% by weight of the composite. Typically, the upper amount of the layered material employed will be no greater than about 80% of the weight of the composite. Preferably, the amount of layered material will be from 1 to 25% by weight of the weight of the composite.

The modified layer material and the polymer matrix material typically are blended in a melt in a suitable mixer. Importantly, the polymer and modified layered material are mixed under mixing conditions sufficient to form packets of the layered material having an average thickness from about 100 Å to about 1400 Å thick. Indeed, it is especially preferred that about 80 vol. % of the layered material have a packet thickness greater than about 100 Å. The amount of mixing energy used to achieve the requisite dispersion is characterized as moderate and is achieved in a Banbury or Brabender mixer and by extrusion, milling and calandering, for example. Importantly, high shear which typically results in substantial exfoliation of the layered material is to be avoided. To determine whether a given mixing condition is sufficient sample runs can be made and the average thickness of the layered material can be determined by methods such as transmission electron microscopy (TEM), x-ray (i.e., synchrotron) scattering, wide angle x-ray scattering among other techniques.

The composite material of the present invention can be used as is in the formation of tire liners, inner tubes, bladders and other substantially air impermeable membranes. Additionally, the composite material of this invention can be combined with a solid rubber in amounts sufficient to lower the viscosity and enhance processability of the composite material, or aid in the separation of packets of the layered material in the compositions and products.

Basically, the solid rubber used for blending with the composite material of the present invention should be one that has a number average molecular weight of greater than about 5,000 g/mol so that it can be vulcanized or cross-linked in the bulk state. Solid rubbers which may be used in the practice of the present invention include butadiene, butadiene copolymers containing styrene, isoprene, acrylonitrile, and isobutylene and isobutylene copolymers containing butadiene, isoprene, styrene or paramethylstyrene.

The following detailed examples are presented to further illustrate the claimed invention. For the various tactoidal nanocomposite films prepared in the examples the size of packets of clay material was determined from transmission electron micrographs of cyrogenic cross-sections of films, or synchrotron x-ray scattering. The volume of the layered material was calculated from the thickness and the diameter of the particles and excludes the intercalant volume, which was estimated from the basal spacing as measured by transmission electron microscopy. The results are summarized in Table 23 located at the end of all the examples.

EXAMPLE 1

Fifty grams of a styrene-butadiene rubber sold under the tradename PLIOFLEX™ 1502 by Goodyear Corp., Akron, Ohio, was dissolved in 800 grams of 1,1,1 trichloroethane by stirring for 24 hours at room temperature. To this, 19 grams of a dialkylammonium montmorillonite sold under the tradename BENTONE-34™ by Rheox, Inc., Hightstown, N.J. was added and ball milled in a porcelain mill jar using porcelain cylindrical media, for 10 hours at room temperature. The solvent was removed from part of this masterbatch under vacuum at 50° C. to form a dried powder. Then 20 mil films were made by compression molding at 102° C. utilizing conventional compression molding techniques. The films were measured for oxygen transmission on a Mocon 2/20 analyzer at 30° C. and tensile properties were measured on an Instron® tester at a crosshead speed of 20 inches per minute. The results are shown in Table 1 and Table 2 as Example 1 and compared to a PLIOFLEX™ 1502 rubber film having no clay content (Comparative Example 1).

EXAMPLE 2

Two hundred grams of the masterbatch of Example 1 (following 10 hours ball milling), was combined with 200 grams of a mixture consisting of 40 g of PLIOFLEX™ 1502 (see Example 1) dissolved in 760 grams 1,1,1 trichlorethane. This blended nanocomposite dispersion was stirred at room temperature for 24 hours; then the solvent was removed at 50° C., in vacuum. Twenty mil films were made by compression molding at 120° C. The films were measured for oxygen transmission and tensile properties as in Example 1. The results are shown in Table 1 and Table 2, as Example 2.

TABLE 1

Permeability Data

| Example | Oxygen Transmission (cm³ mils/m² 24 hr) |
| --- | --- |
| Example 1 | 10,000 |
| Example 2 | 25,000 |
| Comparative Example 1 | 93,000 |

TABLE 2

Mechanical Data

| Example | Peak Stress (psi) | Strain at Break (psi) | 100% Modulus (psi) |
| --- | --- | --- | --- |
| Example 2 | 144 | 292 | 142 |
| Example 1 | 175 | 228 | 169 |
| Comparative Example 1 | 147 | 440 | 53 |

EXAMPLE 3

In a Banbury mixer at 160° C. was mixed 100 parts per hundred (phr) of PLIOFLEX™ 1502 (see Example 1), 40 phr carbon black, 20 phr BENTONE-34™ (see Example 1), and 15 phr of a process oil sold under the tradename FLEXON 885™ by Exxon Chemical Company, Houston, Tex. To this mix, a curing package containing 2 phr zinc oxide, 0.5 phr stearic acid, 2 phr sulfur and 3 phr 2-mercaptobenzothiazol disulfide (MBTS) was added by rubber mill. Then 16 mil films were made by compression molding for 90 minutes at 160° C.

For comparative purposes, a composite was made (Comparative Example 2) as first described, except that it did not contain BENTONE-34 clay and instead contained 60 phr of carbon black.

Oxygen transmission and tensile measurements were made as in Example 1. The Mooney viscosity (ML (1+4) at 100° C.) was measured. Self-adhesion (tack) was measured on a Monsanto Tel-Tac; 8 oz, 6 sec. Rheometry was carried out using a Monsanto Rheometer-160; 3° Arc; 30 minutes;

0 preheat. Fatigue-to-failure was measured on a Monsanto Flexometer, with the results given in cycles to failure. Dynamic stress-strain mechanical analysis was measured on a Seiko DMS 200 at 100 Hz from −70° to 15° C.

The results of oxygen transmission are shown in Table 3. The results of mechanical testing are shown in Tables 4, 5, and 6.

EXAMPLE 4

This composite was made by the methods described in Example 3, except the composition was as follows: 100 phr PLIOFLEX™ 1502 (see Example 1), 50 phr carbon black, 10 phr BENTONE-34™ (see Example 1) and 15 phr FLEXON885™ (see Example 3) process oil. The testing methods were identical to those of Example 3. Results of oxygen transmission are shown in Table 3. Results of mechanical testing are shown in Tables 4, 5, and 6.

TABLE 3

Permeability Data

| Example | Oxygen Transmission (cm$^3$ mils/m$^2$ 24 hr) |
|---|---|
| Example 3 | 30600 |
| Example 4 | 41450 |
| Comparative Example 2 | 55900 |

TABLE 4

Mechanical Properties

| Example | Mooney Viscosity | Monsanto Tel-Tac Self (kpa) | 300% Modulus (Mpa) | Tensile Stress (MPa) | Tensile Strain % | Fatigue to Failure (cycles) |
|---|---|---|---|---|---|---|
| Example 3 | 31.2 | 25 | 5.1 | 16 | 458 | 115162 |
| Example 4 | 32.1 | 21 | 8.1 | 16.6 | 532 | 98257 |
| Comp. Example 2 | 43 | 15 | 6.3 | 11.8 | 519 | 43588 |

TABLE 5

Rheometric Data

| Example | ML (Min. torque) (dN*m) | MH (Max torque) (dN*m) | ts2 (50% cure) (min) | t'90 (90% cure) (min) |
|---|---|---|---|---|
| Example 3 | 6.1 | 39.0 | 2.7 | 10.0 |
| Example 4 | 6.3 | 60.1 | 2.5 | 9.1 |
| Comp. Ex. 2 | 8.2 | 45.8 | 3.6 | 15.1 |

TABLE 6

Dynamic Mechanical Data

| Example | Glass Transition Temperature (°C.) |
|---|---|
| Example 3 | −42.7 |
| Example 4 | −44.3 |
| Comparative Example 2 | −45.5 |

EXAMPLE 5

First, a styrene-butadiene rubber (SBR) was sulfonated as follows: 50 g PLIOFLEX™-1502 (see Example 1) was dissolved in 700 ml cyclohexane by stirring overnight. Separately, the sulfonating agent was prepared by dissolving 2.75 g proprionic anhydride in 50 ml methylene chloride at 23° C., stirring with 0.7 ml sulfuric acid for 5 minutes. This sulfonating agent was added dropwise over 10 minutes to the polymer solution. Separately, a neutralizing solution was prepared by dissolving 3.37 g sodium acetate, in a mixture of 27 ml methanol and 1.5 ml distilled water. This neutralizing solution was added to the sulfonated polymer solution and stirred (23° C.) overnight. The resulting sodium neutralized, sulfonated SBR solid polymer was separated from solution by steam stripping and dried in vacuum at 60° C. overnight. Sulfur analysis showed 22.5 milliequivalents of sulfonate per 100 g polymer.

Next a nanocomposite was prepared as follows: 8.2 g of the sulfonated SBR and 1.8 g BENTONE-34™ (see Example 1), 190 g toluene and 10 g methanol were stirred together for 24 hour at 23° C. The solvents were removed in vacuum at 50° C. The resultant nanocomposite was milled on a 2 roll rubber mill at 55° C. for 18 minutes in order to further disperse the clay in the polymer. Twenty mil films were prepared by compression molding at 205° C. and tested for oxygen transmission and uniaxial tensile properties as in Example 1. For comparison films were prepared as just described except one had an equivalent amount of unmodified sodium montmorillonite (Comparative Example 3) and the other had no montmorillonite content (Comparative Example 4). The results are shown in Tables 7 and 8.

TABLE 7

Permeability Data

| Example | Oxygen Transmission (cm$^3$ mils/m$^2$ 24 hr) |
|---|---|
| Example 5 | 24,000 |
| Comparative Example 3 | 52,500 |
| Comparative Example 4 | 57,800 |

TABLE 8

Mechanical Data

| Example | Peak Stress (psi) | Strain at Break (psi) | 100% Modulus (psi) | 300% Modulus (psi) |
|---|---|---|---|---|
| Example 5 | 1814 | 483 | 618 | 1204 |
| Comparative Example 3 | 1391 | 795 | 246 | 442 |
| Comparative Example 4 | 1030 | 737 | 197 | 355 |

EXAMPLE 6

A polybutadiene-organoclay nanocomposite was made as follows: 8.8 g BENTONE-34™ (see Example 1), and 45 g of polybutadiene sold under the tradename BUDENE-1208™, (Goodyear Corp., Akron, Ohio) were mixed in a Brabender mixer at 50° C. for 5 minutes. Then 1.35 g zinc oxide, 0.9 g stearic acid 1.58 g sulfur, 0.45 g, benzothiazyl disulfide accelerator sold under the tradename ALTAX™ by R. T. Vanderwalt Co., Norwalk, Conn., and 2.7 g isopropanol were combined and added to the melt, which was mixed for an additional five minutes in the Brabender at 80° C.

The resulting material was compression molded into 25 mil films at 165° C. for 15 minutes, vulcanizing the elastomer nanocomposite. These films, and films made identically but containing no clay content (Comparative Example 5), were tested for oxygen transmission and uniaxial tensile properties as in Example 1. The results are shown in Tables 9 and 10.

TABLE 9

Permeability Data

| Example | Oxygen Transmission (cm$^3$ mils/m$^2$ 24 hr) |
|---|---|
| Example 6 | 53300 |
| Example 7 | 31100 |
| Comparative Example 5 | 250000 |

TABLE 10

Mechanical Data

| Example | Peak Stress (psi) | Strain at Break (psi) | 300% Modulus (psi) |
|---|---|---|---|
| Example 6 | 2494 | 855 | 628 |
| Example 7 | 2517 | 795 | 822 |
| Comparative Example 5 | 1091 | 1217 | 171 |

EXAMPLE 7

A polybutadiene nanocomposite was prepared as in Example 6, except more organoclay and less accelerator were used. This example contained 35 g BUDENE-1208™ (see Example 6) 15 g BENTONE-34™ (see Example 1), 1.05 g zinc oxide, 0.7 g sulfur, and 0.088 g ALTAX™ accelerator (see Example 6). Process conditions and testing methods were the same as Example 6. Results are shown in Tables 9 and 10.

EXAMPLE 8

This natural rubber nanocomposite was prepared as in Example 6, except less accelerator was used. The composition was 45 g natural rubber sold under the tradename SMR-20™ by Herman Weber, Newark, N.J., 1.35 g zinc oxide, 0.9 g stearic acid, 1.58 g sulfur, and 0.23 g ALTAX™ accelerator (see Example 6). Process conditions and testing methods were the same as Example 6. Results are shown in Tables 11 and 12.

EXAMPLE 9

This natural rubber nanocomposite was prepared as in Example 6, except more organoclay, and less accelerator were used. This material contained 35 g natural rubber SMR-20™ (see Example 8), 15 g BENTONE-34™ (see Example 1) 1.05 g zinc oxide, 0.7 g sulfur, and 0.088 g ALTAX™ accelerator (see Example 6). Process conditions and testing methods were the same as Example 6. Results are shown in Tables 11 and 12.

TABLE 11

Permeability Data

| Example | Oxygen Transmission (cm$^3$ mils/m$^2$ 24 hr) |
|---|---|
| Example 8 | 18,400 |
| Example 9 | 8,900 |
| Comparative Example 6 | 69,800 |

TABLE 12

Mechanical Data

| Example | Peak Stress (psi) | Strain at Break (psi) | 300% Modulus (psi) |
|---|---|---|---|
| Example 8 | 2,867 | 470 | 1,573 |
| Example 9 | 2,640 | 330 | 2,319 |
| Comparative Example 6 | 3,057 | 863 | 349 |

EXAMPLE 10

100 parts per hundred ("phr") of a lightly brominated isobutylene-paramethyl styrene rubber sold under the tradename EXXPRO89-4™ by Exxon Chemical Company, Houston, Tex., 40 phr carbon black, 20 phr BENTONE-34™ (see Example 1) and FLEXON 885™ (see Example 3) were mixed in a Banbury mixer for 10 minutes at a dump temperature of about 120° C. Then, the resultant material was blended on a rubber mill with 3 phr of an amine curing agent sold under the tradename DIAK-3™ by DuPont de Nemours, Wilmington, Del. 17 mil films were made by compression molding at 160° C. Cure time was established by use of a Monsanto Rheometer-160 measuring t'90, MH, ML and ts2. A comparison material made identically except having no clay component, (Comparative Example 7) was cured at 170° C. in order to approximate the same cure state as in Example 10. Oxygen transmission and tensile properties were measured as in Example 1. Tack (adhesive property) was measured as in Example 3. Results are shown in Tables 13 and 14. Using transmission electron microscopy the product of Example 10 was found to have packets with 99.905 vol. % of packets with a thickness greater than 100 Å and an average packet thickness of 154 Å. X-ray diffraction of this product measured a d001 basal spacing of 33.95 A, indicating additional swelling of the clay interlayer space (greater than that of the BENTONE-34™) by components of the product, which may include the matrix elastomer.

TABLE 13

Permeability Data

| Example | Oxygen Transmission (cm$^3$ mils/m$^2$ 24 hr) |
|---|---|
| Example 10 | 2960 |
| Comparative Example 7 | 6700 |

TABLE 14

Mechanical Properties

| Example | Monsanto Tel-Tac Self (kpa) | 300% modulus (MPa) | Tensile Stress (MPa) | Tensile Strain (%) |
|---|---|---|---|---|
| Example 10 | 25 | 1015 | 1204 | 362 |
| Comparative Example 7 | 31 | 1204 | 1523 | 276 |

EXAMPLE 11

In this example, 3 g of montmorillonte clay was mixed with 4.5 g of a poly (15) oxyethylene amine and 300 g water in high speed Waring blender for 3 minutes at 40° C. The mixture was centrifuged at 10000 RPM for one hour. The residue was subsequently washed by repeated (3 times) mixing and centrifugation process. The intercalated clay was freeze-dried to dryness. This procedure took about 24 hours. Subsequently, 5 g of the above clay was blended with 45 g of isobutylene-paramethylstyrene copolymer containing benzylic bromide functionality (see Example 10) on a conventional rubber mill at 55° C. for 18 minutes. The product was then compression molded (100° C., 14 minutes) to form a uniform film (20 mil thick samples).

These films were tested for both its tensile properties as well as its air permeability, i.e., oxygen transmission (as in Example 1). The oxygen transmission data is presented in Table 15 and is denoted as Example 11. The Comparative Example 8 is the copolymer without the intercalated clay present. The latter material was milled and compression molded into a film product as in the clay-filled material.

The uniaxial tensile properties were measured with the detailed results presented in Table 16.

TABLE 15

Permeability Data

| Film | Oxygen Transmission ($cm^3$ × mils/$m^2$ × 24 hr) |
| --- | --- |
| Example 11 | 3,030 |
| Comparative Example 8 | 3,590 |

TABLE 16

Stress-Strain Measurements

| Film | Stress at Break (psi) | Strain at Break (%) | Energy at Break (in-lbs) | 100% modulus (psi) | 300% modulus (psi) |
| --- | --- | --- | --- | --- | --- |
| Example 11 | 67.7 | 1,987 | 3.5 | 58.3 | 66.5 |
| Comparative Example 8 | 48.7 | 1,608 | 1.2 | 41.1 | 47 |

EXAMPLE 12

10 g acrylated isobutylene-paramethylstyrene copolymer was dissolved in 200 g toluene overnight at 23° C. 1.0 g BENTONE-34™ (see Example 1) was dispersed in the solution by mechanical mixing and ultrasonic vibration at 60° C. Ultrasound was applied during the stirring process using an Ultrasonics Inc. W-225R sonicator probe for 15 minutes distributed over a 4 hour period. The polymer nanocomposite was precipitated in excess methanol and the solvent removed at 60° C. for 12 hours under vacuum. 25 mil films were made by compression molding at 165° C. for 5 minutes. Films were tested for oxygen transmission and uniaxial tensile properties as in Example 1. Results of the nanocomposite (Example 12) and acrylated copolymer control having no clay (Comparative Example 9) are shown in Table 17 and Table 18.

TABLE 17

Permeability Data

| Film | Oxygen Transmission ($cm^3$ × mils/$m^2$ × 24 hr) |
| --- | --- |
| Example 12 | 2,536 |
| Comparative Example 9 | 6,520 |

TABLE 18

Stress-Strain Measurements

| Film | Stress at Break (psi) | Strain at Break (%) | Energy at Break (lbs) | 100% modulus (psi) | 300% modulus (psi) |
| --- | --- | --- | --- | --- | --- |
| Example 12 | 100 | 864 | 1.2 | 92.9 | 80 |
| Comparative Example 9 | 69.9 | 1,868 | 1.2 | 53.9 | 68.9 |

EXAMPLE 13

45 g isobutylene-isoprene copolymer sold under the tradename BUTYL 268™, by Exxon Chemical Co., Houston, Tex., 2.7 g maleic anhydride, 0.1 g dicumyl peroxide and 10 g BENTONE-34™ (see Example 1) were melt blended together in a Brabender at 165° C. for 6 minutes. 25 mil films were made by compression molding at 165° C. These films and films prepared identically having no silicate content were tested for oxygen transmission and uniaxial tensile properties as in Example 1. The results of the nanocomposite (Example 13) and the control having no clay (Comparative Example 10) are shown in Tables 19 and 20.

TABLE 19

Permeability Data

| Film | Oxygen Transmission ($cm^3$ × mils/$m^2$ × 24 hr) |
| --- | --- |
| Example 13 | 2,070 |
| Comparative Example 10 | 4,613 |

TABLE 20

Stress-Strain Measurements

| Film | Stress at Break (psi) | Strain at Break (%) | Energy at Break (lbs) | 100% modulus (psi) | 300% Modulus (psi) |
| --- | --- | --- | --- | --- | --- |
| Example 13 | 107.4 | 1981 | 1.9 | 106 | 85.6 |
| Comparative Example 10 | 52.9 | 946 | 0.6 | 48.4 | 48.3 |

EXAMPLE 14

Isobutylene-paramethylstyrene copolymer; 5.5% wt. paramethylstyrene was sulfonated according to U.S. Pat. No. 3,642,728 as follows: 50 g of this polymer was dissolved in 600 g cyclohexane for 8 hours by stirring. Separately, 9.1 ml triethyl phosphate and 50 ml 1,2-dichloroethane were mixed together. 2.25 ml sulfur trioxide was melted at 44.2° C., added to the triethyl phosphate/1,2-dichloroethane mixture and stirred for 10 minutes. Then this mixture was dripped slowly into the copolymer solution. The solution was allowed to sulfonate while mixing for 45 minutes. Subsequently, 8.3 g sodium hydroxide in 2.5 ml methanol was added to neutralize the copolymer. Then 4% by volume isopropanol was added as cosolvent. The solution was mixed overnight. The functionalized copolymer was isolated by a stream stripping procedure with the material being dried in a vacuum oven at 65° C. overnight. Sulfur analysis showed 1.1 wt. % sulfur content on the copolymer.

Next, 10 g of the sulfonated isobutylene-paramethylstyrene copolymer was dissolved in 180 g toluene/20 g isopropanol and stirred at 30° C. for 2 hours. To this solution, 1.8 g BENTONE-34™ (see Example 1) was added and stirred for 72 hours at 30° C. Solvents were removed in vacuum at 50° C. for 18 hours and 25 mil films were compression molded at 165° C. for 10 minutes. Nanocomposite films (Example 14) and control sulfonated copolymer films (Comparative Example 11) having no silicate content were tested for oxygen transmission and uniaxial tensile properties as in Example 1. The results are shown in Tables 21 and 22.

TABLE 21

Permeability Data

| Film | Oxygen Transmission ($cm^3$ × mils/$m^2$ × 24 hr) |
|---|---|
| Example 14 | 2,251 |
| Comparative Example 11 | 3,705 |

TABLE 22

Stress-Strain Measurements

| Film | Stress at Break (psi) | Strain at Break (%) | Energy at Break (lbs) | 100% modulus (psi) | 300% modulus (psi) |
|---|---|---|---|---|---|
| Example 14 | 344 | 1,963 | 6.4 | 114 | 110 |
| Comparative Example 22 | 358 | 1,987 | 4.9 | 71 | 86 |

TABLE 23

Particle Size Data

| Example | Average Packet Thickness (Å) | Amount of Layered Material <100 Å Thick (Volume %) | Amount of Layered Material >100 Å Thick (Volume %) |
|---|---|---|---|
| Example 1 | 196 | 0.025 | 99.975 |
| Example 2 | 265 | 0.003 | 99.997 |
| Example 3 | 196 | 0.012 | 99.988 |
| Example 4 | 222 | 0.001 | 99.999 |
| Example 5 | 132 | 0.060 | 99.940 |
| Example 6 | 299 | 0.122 | 99.988 |
| Example 7 | 239 | 0.048 | 99.952 |
| Example 8 | 138 | 1.278 | 98.732 |
| Example 9 | 135 | 0.536 | 99.464 |
| Example 10 | 154 | 0.095 | 99.905 |
| Example 11 | 206 | 0 | 100 |
| Example 12 | 477 | 0 | 100 |
| Example 13 | 506 | 0 | 100 |
| Example 14 | 215 | 0 | 100 |

What is claimed is:

1. A composite comprising:

an elastomer and a layered material dispersed in the elastomer in the form of packets having an average thickness of from about 100 Å to about 1400 Å.

2. The composite of claim 1 wherein the elastomer is selected from the group consisting of natural rubber, polyisoprene, polybutadiene, copolymers of butadiene with isobutylene or isoprene, functionalized copolymers of isobutylene with isoprene, and copolymers of isobutylene with paramethylstyrene or functionalized paramethylstyrene.

3. The composite of claim 2 wherein about 80 vol. % of the layered material has a packet thickness greater than 100 Å.

4. The composite of claim 3 wherein the layered material includes a hydrocarbyl onium salt swelling agent.

5. A pnuematic tire having a tire inner liner or inner tube comprising an elastomer and a layered material dispersed in the elastomer in the form of packets having an average thickness of from about 100 Å to about 1400Å.

6. The tire inner liner or inner tube of claim 5 wherein the elastomer is selected from the group consisting of natural rubber, polybutadiene, copolymers of butadiene with butylene or isoprene, functionalized copolymers of isobutylene with isoprene, and copolymers of isobutylene with paramethylstyrene or functionalized para methylstyrene.

7. The tire inner liner or inner tube of claim 6 wherein about 80 vol. % of the layered material has a packet thickness greater than 100Å.

8. A substantially air impermeable elastomer membrane comprising an elastomer matrix having a layered material dispersed therein in the form of packets having an average packet thickness in the range of from about 100 Å to about 1400Å.

9. The membrane of claim 8 wherein the elastomer is selected from the group consisting of natural rubber, polyisoprene, polybutadiene, copolymers of butadiene with isobutylene or isoprene, functionalized copolymers of isobutylene with isoprene, and copolymers of isobutylene with para methyl styrene or functionalized para methyl styrene.

10. The membrane of claim 9 wherein about 80 vol. % of the layered material has a packet thickness greater than 100 Å.

* * * * *